United States Patent
Nakamura

(10) Patent No.: US 10,715,735 B2
(45) Date of Patent: Jul. 14, 2020

(54) HEAD-MOUNTED DISPLAY, DISPLAY CONTROL METHOD, AND PROGRAM

(71) Applicant: Sony Interactive Entertainment Inc., Tokyo (JP)

(72) Inventor: Yuichiro Nakamura, Redwood City, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 15/570,872

(22) PCT Filed: Jun. 6, 2016

(86) PCT No.: PCT/JP2016/066792
§ 371 (c)(1),
(2) Date: Oct. 31, 2017

(87) PCT Pub. No.: WO2016/199731
PCT Pub. Date: Dec. 15, 2016

(65) Prior Publication Data
US 2018/0295290 A1 Oct. 11, 2018

(30) Foreign Application Priority Data
Jun. 10, 2015 (JP) .................. 2015-117762

(51) Int. Cl.
*H04N 5/232* (2006.01)
*H04N 5/64* (2006.01)
(Continued)

(52) U.S. Cl.
CPC ......... *H04N 5/23296* (2013.01); *G06F 1/163* (2013.01); *G06F 1/1686* (2013.01);
(Continued)

(58) Field of Classification Search
CPC .......... G02B 27/017; G02B 2027/0138; G02B 2027/014; G02B 2027/0178;
(Continued)

(56) References Cited

U.S. PATENT DOCUMENTS 8,510,166 B2    8/2013 Neven
8,611,015 B2 * 12/2013 Wheeler ................ A61B 3/113
                                                        359/630

(Continued)

FOREIGN PATENT DOCUMENTS

CN    103561635 A    2/2014
JP       8313843 A   11/1996
(Continued)

OTHER PUBLICATIONS

International Preliminary Report on Patentability and Written Opinion for corresponding PCT Application No. PCT/JP2016/066792, 8 pages, dated Dec. 21, 2017.

(Continued)

*Primary Examiner* — Chiawei Chen
(74) *Attorney, Agent, or Firm* — Matthew B. Dernier, Esq.

(57) ABSTRACT

There are provided a head-mounted display, a display control method, and a program for changing the position of the image of an object near the optical axis of a camera in an image displayed on a display section. A camera control section controls the direction of the optical axis of the camera capturing an image of what is ahead of the display section disposed in front of the user's eyes. A display control section causes the display section to display a partial image cut out from the image captured by the camera, the partial image constituting a portion corresponding to the optical axis direction of the camera.

5 Claims, 7 Drawing Sheets

(51) Int. Cl.
| | |
|---|---|
| G09G 5/00 | (2006.01) |
| H04N 13/00 | (2018.01) |
| H04N 7/18 | (2006.01) |
| G09G 5/36 | (2006.01) |
| G09G 3/00 | (2006.01) |
| H04N 13/30 | (2018.01) |
| H04N 13/20 | (2018.01) |
| G06F 3/01 | (2006.01) |
| G06F 1/16 | (2006.01) |
| G06F 3/0484 | (2013.01) |
| G06F 3/03 | (2006.01) |
| H04N 13/332 | (2018.01) |
| H04N 13/383 | (2018.01) |
| H04N 13/296 | (2018.01) |
| H04N 13/239 | (2018.01) |
| H04N 5/262 | (2006.01) |

(52) U.S. Cl.
CPC .............. *G06F 3/011* (2013.01); *G06F 3/012* (2013.01); *G06F 3/013* (2013.01); *G06F 3/0304* (2013.01); *G06F 3/04842* (2013.01); *G09G 3/001* (2013.01); *G09G 5/00* (2013.01); *G09G 5/36* (2013.01); *H04N 5/2628* (2013.01); *H04N 5/64* (2013.01); *H04N 7/18* (2013.01); *H04N 13/00* (2013.01); *H04N 13/20* (2018.05); *H04N 13/239* (2018.05); *H04N 13/296* (2018.05); *H04N 13/30* (2018.05); *H04N 13/332* (2018.05); *H04N 13/383* (2018.05)

(58) Field of Classification Search
CPC ............ G02B 27/0093; G02B 27/0172; G02B 27/2228; G06F 3/012; G06F 3/013; G06F 1/1686; G06F 3/04842; G06F 3/0304; G06F 1/163; G06F 3/011; G06F 3/0346; H04N 13/344; H04N 13/128; H04N 13/20; H04N 13/239; H04N 5/23296; H04N 5/64; H04N 13/00; H04N 7/18; H04N 13/30; H04N 13/332; H04N 13/383; H04N 13/296; H04N 5/2628; A61B 3/113; B44D 2/002; G09G 5/00; G09G 5/36; G09G 3/001
See application file for complete search history.

(56) References Cited

U.S. PATENT DOCUMENTS

| | | | | |
|---|---|---|---|---|
| 10,108,018 | B2 | 10/2018 | Takahashi | |
| 2008/0246830 | A1* | 10/2008 | Martin | H04N 5/23203 348/14.02 |
| 2009/0160952 | A1* | 6/2009 | Nakakuki | H04N 5/23248 348/208.4 |
| 2010/0240988 | A1* | 9/2010 | Varga | G02B 27/017 600/425 |
| 2012/0106931 | A1* | 5/2012 | Lee | H04N 5/775 386/278 |
| 2012/0290401 | A1 | 11/2012 | Neven | |
| 2013/0335543 | A1* | 12/2013 | Hilkes | G06F 3/013 348/62 |
| 2014/0125579 | A1 | 5/2014 | Yamamoto | |
| 2014/0139404 | A1* | 5/2014 | Takeda | G02B 27/0172 345/8 |
| 2014/0176722 | A1 | 6/2014 | Sashida | |
| 2014/0300765 | A1* | 10/2014 | Takao | H04N 5/23254 348/208.1 |
| 2015/0009416 | A1* | 1/2015 | Tamayama | H04N 9/3185 348/746 |
| 2015/0015727 | A1* | 1/2015 | Ryu | H04N 5/23254 348/208.1 |
| 2015/0044662 | A1* | 2/2015 | Goto | G06F 3/011 434/365 |
| 2015/0156461 | A1* | 6/2015 | Jessop | H04N 7/18 348/47 |
| 2015/0205126 | A1* | 7/2015 | Schowengerdt | H04N 5/225 345/633 |
| 2015/0215500 | A1* | 7/2015 | He | H04N 1/00116 348/158 |
| 2015/0293362 | A1 | 10/2015 | Takahashi | |
| 2016/0255305 | A1* | 9/2016 | Ritchey | H04N 5/2254 348/14.03 |
| 2016/0284129 | A1* | 9/2016 | Nishizawa | G06F 3/013 |
| 2016/0291330 | A1* | 10/2016 | Kurokawa | A61B 3/113 |
| 2016/0295120 | A1* | 10/2016 | Ota | H04N 5/23293 |
| 2017/0068119 | A1* | 3/2017 | Antaki | H04N 5/2251 |
| 2017/0123491 | A1* | 5/2017 | Hansen | G06F 3/012 |
| 2017/0309057 | A1* | 10/2017 | Vaganov | H04N 13/30 |
| 2017/0318235 | A1* | 11/2017 | Schneider | G02B 27/2228 |
| 2019/0297263 | A1* | 9/2019 | Wu | G06T 7/207 |

FOREIGN PATENT DOCUMENTS

| | | | |
|---|---|---|---|
| JP | 2000101898 A | | 4/2000 |
| JP | 2004205711 A | | 7/2004 |
| JP | 2008252711 A | | 10/2008 |
| JP | 2012002889 A | | 1/2012 |
| JP | 2013210588 A | | 10/2013 |
| JP | 2014127744 A | | 7/2014 |
| JP | 2016186561 A | * | 10/2016 |
| JP | 2016186561 A | | 10/2016 |
| WO | 2014077046 A1 | | 5/2014 |

OTHER PUBLICATIONS

International Search Report for corresponding PCT Application No. PCT/JP2016/066792, 4 pages, dated Jul. 19, 2016.
Extended European Search Report for corresponding EP Application No. 16807438.3, 9 pages, dated Dec. 19, 2018.
First Office Action for corresponding CN Application No. 201680032213, 17 pages, dated Aug. 16, 2019.

* cited by examiner

HEAD-MOUNTED DISPLAY, DISPLAY CONTROL METHOD, AND PROGRAM

TECHNICAL FIELD

The present invention relates to a head-mounted display, a display control method, and a program.

BACKGROUND ART

There exist head-mounted displays (HMDs) to be mounted on the head of a user for visual appreciation, as described in PTLs 1 to 3, for example. Some of the HMDs are equipped with a camera that captures an image of what is ahead of a display section of the HMD so that the user will recognize what is taking place before the display section using the captured image being displayed.

There also exists a technology for visual line tracking allowing the direction of the user's visual line to be tracked using iris detection.

CITATION LIST

Patent Literature

[PTL 1] JP 2004-205711 A; [PTL 2] JP 2012-2889 A; [PTL 3] JP 2013-210588 A

SUMMARY

Technical Problem

In the image captured by a camera, an object appears more clearly the closer it is to the optical axis of the camera. It follows that the user can view a clear image of the object if the image of the object close to the optical axis of the camera is made to appear in a position in the direction of the user's visual line.

With the existing HMDs, however, the image of the object near the optical axis of the camera is displayed in a manner being fixed to the center of the image appearing on the display section. This prevents the user from viewing a clear image if the user's visual line is shifted away from the center of the image displayed on the display section.

The present invention has been made in view of the above circumstances. An object of the present invention is therefore to provide a head-mounted display, a display control method, and a program for changing the position of the image of an object near the optical axis of the camera inside an image displayed on the display section.

Solution to Problem

In solving the above problem and according to the present invention, there is provided a head-mounted display worn by a user, the head-mounted display including: a display section configured to be disposed in front of the eyes of the user; a camera configured to capture an image of what is ahead of the display section; a camera control section configured to control the direction of an optical axis of the camera; and a display control section configured to cause the display section to display a partial image cut out from the image captured by the camera, the partial image constituting a portion corresponding to the optical axis direction of the camera.

One embodiment of the present invention may further include a detection section configured to detect the direction of a visual line of the user. The camera control section controls the optical axis direction of the camera in accordance with the visual line direction of the user.

In this embodiment, if the optical axis direction of the camera is changed, that position in the captured image from which the partial image is cut out may be changed in a direction opposite the changed optical axis direction of the camera.

Alternatively, the display control section may perform control in a manner causing an image of an object on the optical axis of the camera to be displayed in a position in the visual line direction of the user.

Also in this embodiment, if the image captured by the camera includes a predetermined image, the camera control section may start controlling the optical axis direction of the camera.

According to the present invention, there is provided a display control method including: a step of controlling the direction of an optical axis of a camera attached to a head-mounted display worn by a user; and a step of causing a display section disposed in front of the eyes of the user to display a partial image cut out from an image captured by the camera, the partial image constituting a portion corresponding to the optical axis direction of the camera.

According to the present invention, there is provided a program for causing a computer to perform: a procedure of controlling the direction of an optical axis of a camera attached to a head-mounted display worn by a user; and a procedure of causing a display section disposed in front of the eyes of the user to display a partial image cut out from an image captured by the camera, the partial image constituting a portion corresponding to the optical axis direction of the camera.

DESCRIPTION OF EMBODIMENTS

Some embodiments of the present invention are described below with reference to the accompanying drawings.

Figure 1:
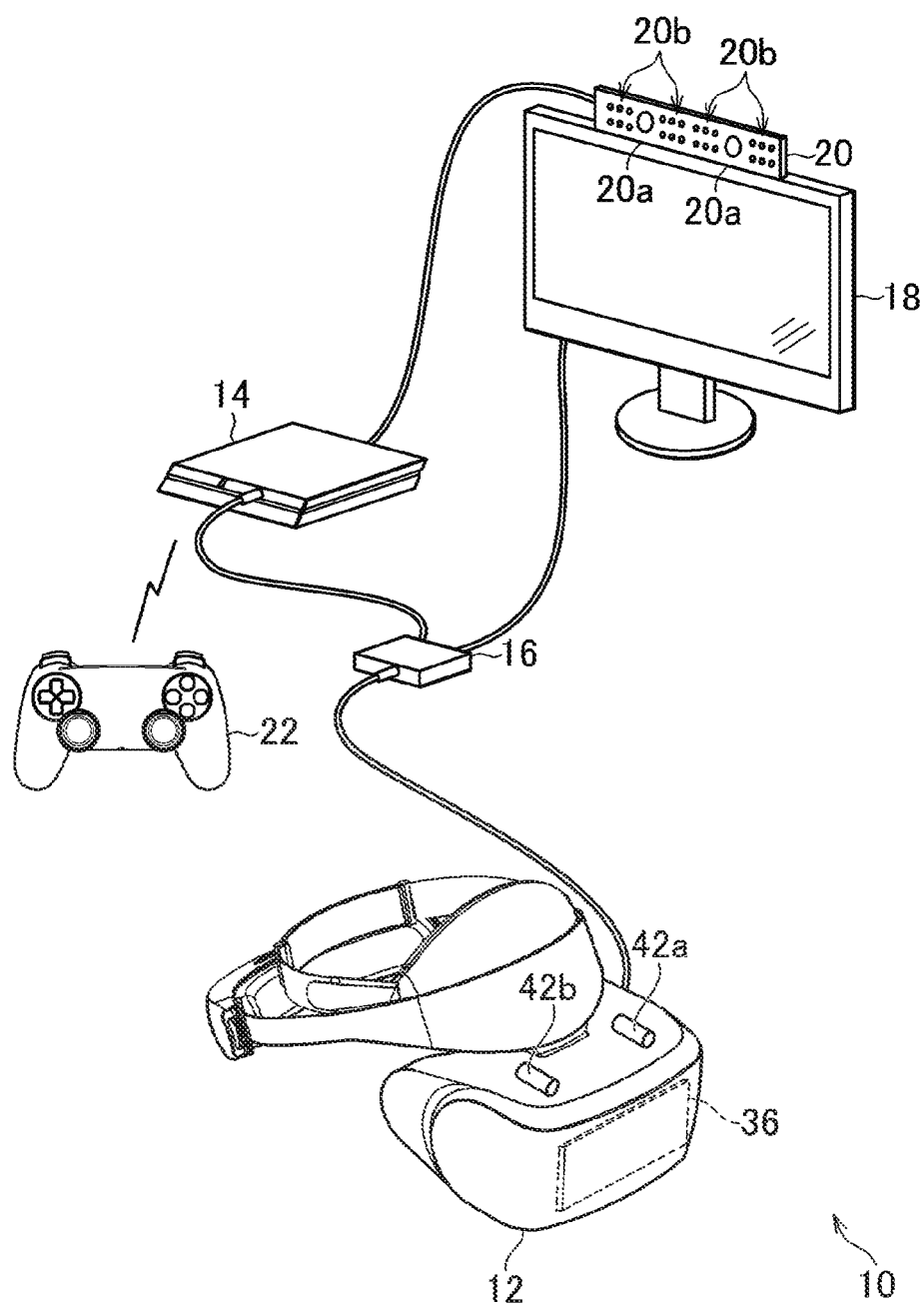
FIG. 1 is a schematic diagram depicting a typical overall configuration of an image display system embodying the present invention.
Figure 2:
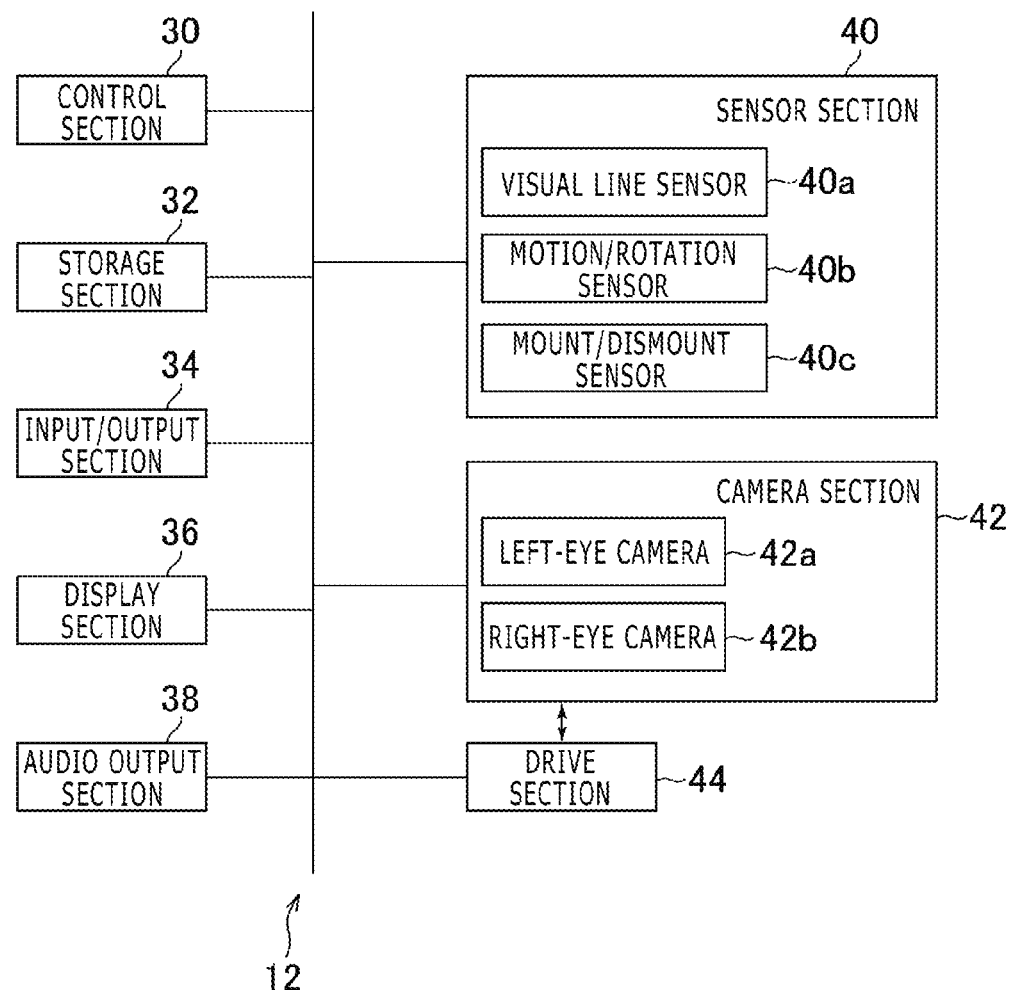
FIG. 2 is a block diagram depicting a typical configuration of a head-mounted display embodying the present invention.

FIG. 1 is a schematic diagram depicting a typical overall configuration of an image display system 10 embodying the present invention. FIG. 2 is a block diagram depicting a typical configuration of a head-mounted display (HMD) 12 embodying the present invention.

As depicted in FIG. 1, the image display system 10 embodying the present invention includes the HMD 12, an entertainment device 14, a repeating device 16, a display unit 18, a camera/microphone unit 20, and a controller 22.

The HMD 12 embodying the present invention includes, for example, a control section 30, a storage section 32, an input/output section 34, a display section 36, an audio output section 38, a sensor section 40, a camera section 42, and a drive section 44 as depicted in FIG. 2.

The control section 30 may be a program-controlled device such as a microprocessor that operates in accordance with programs installed in the HMD 12, for example.

The storage section 32 may be a storage element such as a read-only memory (ROM) or a random access memory (RAM). The storage section 32 stores the programs, among others, that are executed by the control section 30.

The input/output section 34 is an input/output port such as a High-Definition Multimedia Interface (HDMI; registered trademark) port or a Universal Serial Bus (USB) port.

The display section 36 is a display unit such as a liquid crystal display or an organic electroluminescent (EL) display. The display section 36 displays images generated by the entertainment device 14 or captured by the camera section 42. The display section 36 in the present embodiment is configured to display a three-dimensional image by presenting a right-eye-use image and a left-eye-use image, for example. Alternatively, the display section 36 may be configured to display two-dimensional images alone, with no presentation of three-dimensional images.

The audio output section 38, configured as speakers for example, outputs sounds represented by audio data generated typically by the entertainment device 14.

The sensor section 40 in the present embodiment may include a visual line sensor 40a, a motion/rotation sensor 40b, and a mount/dismount sensor 40c, for example.

The visual line sensor 40a in the present embodiment may be a camera capable of tracking the visual line direction of the user wearing the HMD 12 at a predetermined frame rate (e.g., at intervals of 1/60 second) using known iris detection technology, for example.

The motion/rotation sensor 40b in the present embodiment may be an acceleration sensor or a motion sensor, for example. The motion/rotation sensor 40b measures the attitude, rotation amount, and travel distance of the HMD 12 and outputs the measurements to the control section 30 at a predetermined frame rate. Based on the measurements, the control section 30 identifies the travel distance and rotation amount of the HMD 12 per unit time, i.e., the velocity and angular velocity of the HMD 12.

The mount/dismount sensor 40c may be an infrared ray sensor, for example, which is capable of detecting whether the HMD 12 is mounted on or dismounted from the user.

The sensor section 40 may include sensors other than the visual line sensor 40a, motion/rotation sensor 40b, and mount/dismount sensor 40c.

The camera section 42 may be a digital camera, for example, which captures at a predetermined frame rate an image of the surroundings of the user wearing the HMD 12. The camera section 42 in the present embodiment is configured as a stereo camera that includes a left-eye camera 42a for capturing a left-eye-use image and a right-eye camera 42b for capturing a right-eye-use image. The left-eye camera 42a and the right-eye camera 42b are each configured to include lenses and an imaging device, for example. In the present embodiment, as depicted in FIG. 1, the left-eye camera 42a and the right-eye camera 42b are disposed side by side above the display section 36 to capture an image of what is ahead of the display section 36. Also in the present embodiment, the left-eye camera 42a and the right-eye camera 42b are configured to let the directions of their optical axes be changed as needed. For example, the optical axis direction of the lenses mounted in each camera may be changed as desired.

The drive section 44 may be a motor arrangement. In accordance with position control signals received from the control section 30, for example, the drive section 44 changes the directions of the left-eye camera 42a and the right-eye camera 42b in the camera section 42.

The entertainment device 14 in the present embodiment may be a computer such as a game console, a Digital Versatile Disc (DVD) player, or a Blu-ray (registered trademark) player, for example. The entertainment device 14 in the present embodiment outputs, to the HMD 12 or to the display unit 18 via the repeating device 16, video signals representative of the images generated by execution of stored game programs or by reproduction of content recorded on an optical disk, for example.

The display unit 18 in the present embodiment may be a liquid crystal display, for example, which displays images represented by video signals output from the entertainment device 14.

The camera/microphone unit 20 in the present embodiment includes cameras 20a that output images captured of an object to the entertainment device 14, and microphones 20b that acquire sounds from the surroundings, convert the acquired sounds into audio data, and output the audio data to the entertainment device 14. The cameras 20a in the present embodiment constitute a stereo camera.

The HMD 12 and the repeating device 16 are interconnected by an HDMI cable or by a USB cable, for example. The entertainment device 14 and the repeating device 16 are interconnected by an HDMI cable or by a USB cable, for example. The repeating device 16 and the display unit 18 are interconnected by an HDMI cable, for example. The entertainment device 14 and the camera/microphone unit 20 are interconnected by an auxiliary (AUX) cable, for example.

The controller 22 in the present embodiment is an operation input device that permits operation input to the entertainment device 14. The user may perform various kinds of operation input using the controller 22 by operating arrow keys or buttons or by tilting operating sticks on the controller 22. The controller 22 in the present embodiment outputs input data reflecting the operation input to the entertainment device 14. The controller 22 in the present embodiment has a USB port. The USB port allows the controller 22 to connect with the entertainment device 14 using a USB cable so that the input data may be output to the entertainment device 14 in wired fashion. The controller 22 in the present embodiment further includes a wireless communication module, for example, which outputs the input data wirelessly to the entertainment device 14.

In the present embodiment, as described above, the display section 36 displays the image generated by the entertainment device 14 through execution of game programs or through reproduction of content such as movies recorded on an optical disk. Also in the present embodiment, as discussed above, the display section 36 displays the image of what is taking place in front of the user wearing the HMD 12, the image being captured by the camera section 42. By operating the controller 22, the user wearing the HMD 12 may select, as needed, either the image generated by the entertainment device 14 or the image captured by the camera section 42.

Described below is how the image captured by the camera section 42 is displayed on the display section 36.

Figure 3:
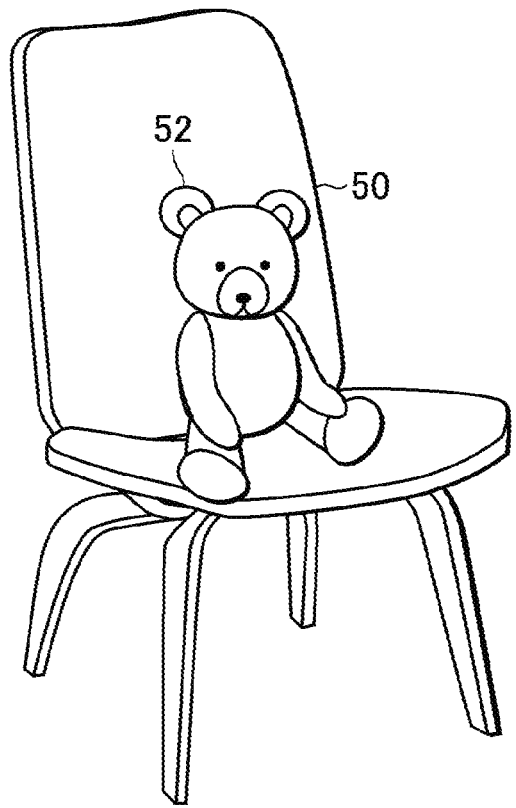
FIG. 3 is a schematic diagram depicting a chair and a stuffed toy disposed in a real space.

FIG. 3 is a schematic view depicting objects disposed in a real space where the user wearing the HMD 12 is located. It is assumed here that there are a chair 50 and a stuffed toy 52 placed on the chair 50, as depicted in FIG. 3, in the real space where the user is located.

Figure 4:
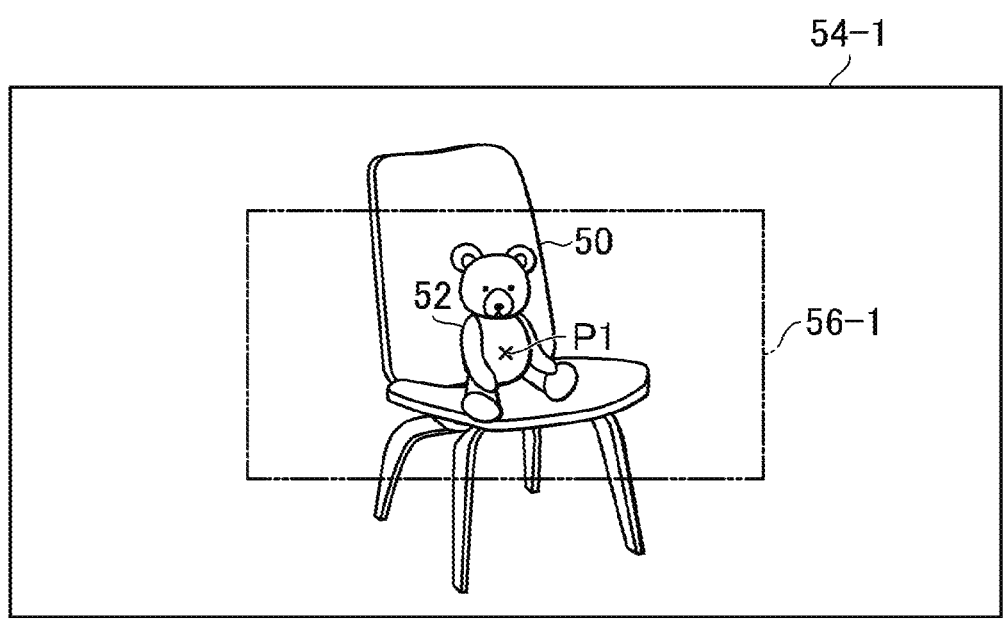
FIG. 4 is a schematic view depicting a typical captured image.

In the present embodiment, when the user wearing the HMD 12 turns in the direction of the chair 50 with the stuffed toy 52 placed on it, the left-eye camera 42a captures an image that includes a captured image 54-1 depicted in FIG. 4, for example, as a frame image. The captured image 54-1 depicted in FIG. 4 includes an image of the chair 50 and an image of the stuffed toy 52.

In the present embodiment, in accordance with the user's visual line direction detected by the visual line sensor 40a, a partial area in the captured image 54-1 is identified as a cutout area 56-1. FIG. 4 depicts a typical cutout area 56-1 applicable where the visual line of the user's left eye is in a straight-ahead direction. In this manner, in the present embodiment, when the visual line of the user's left eye is in the straight-ahead direction, a center area of the captured image 54-1 is identified as the cutout area 56-1.

Figure 5:
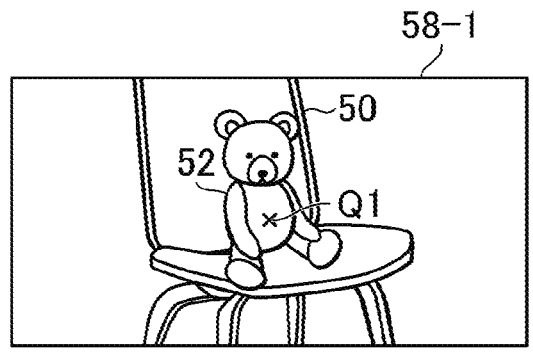
FIG. 5 is a schematic view depicting a typical partial image.

In the present embodiment, an image occupying the cutout area 56-1 cut out from the captured image 54-1 in FIG. 4 is displayed on the display section 36 as a partial image 58-1 depicted in FIG. 5, the partial image 58-1 constituting the left-eye-use image.

In the present embodiment, when the user changes the visual line direction of the left eye, the optical axis direction of the left-eye camera 42a is changed in the changed visual line direction.

Figure 6:
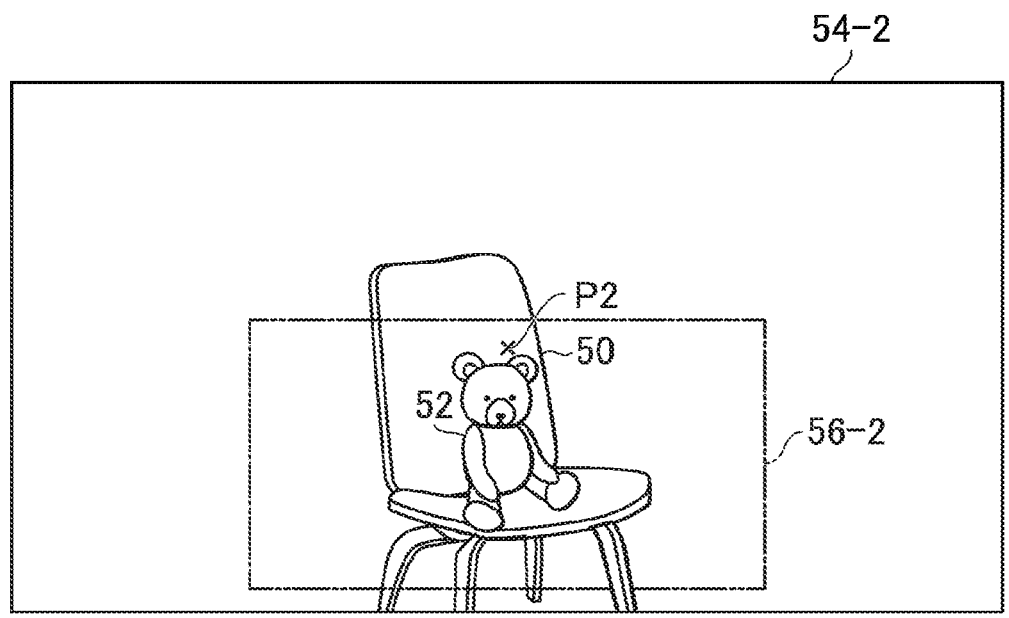
FIG. 6 is a schematic view depicting another typical captured image.

Suppose that the visual line sensor 40a detects the visual line of the user's left eye being shifted upward from the straight-ahead direction. In that case, the left-eye camera 42a has its optical axis controlled to be shifted upward in accordance with the changed visual line direction. FIG. 6 depicts a typical image 54-2 captured by the left-eye camera 42a with its optical axis shifted upward as described above. With the optical axis of the left-eye camera 42a shifted upward, the image of the chair 50 and that of the stuffed toy 52 in the captured image 54-2 in FIG. 6 are positioned relatively lower than the corresponding image of the chair 50 and that of the stuffed toy 52 in the captured image 54-1 in FIG. 4.

In the present embodiment, an area inside the captured image 54-2 reflecting the optical axis direction of the left-eye camera 42a is identified as a cutout area 56-2. When, for example, the optical axis direction of the left-eye camera 42a is changed, the cutout area 56-2 in the captured image 54-2 is shifted in a direction opposite the changed optical axis direction of the left-eye camera 42a. If the optical axis of the left-eye camera 42a is shifted upward in accordance with the user's visual line direction being lifted, for example, an area located lower than the center of the captured image 54-2 in FIG. 6 is identified as the cutout area 56-2.

Figure 7:
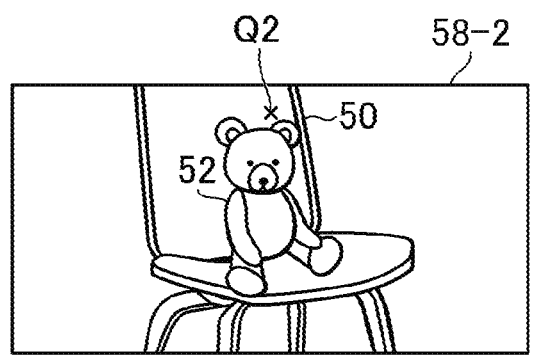
FIG. 7 is a schematic view depicting another typical partial image.

In the present embodiment, the display section 36 thus displays a partial image 58-2 which appears in FIG. 7 and which is cut out from the captured image 54-2 in FIG. 6 as the image occupying the cutout area 56-2.

Figure 8:
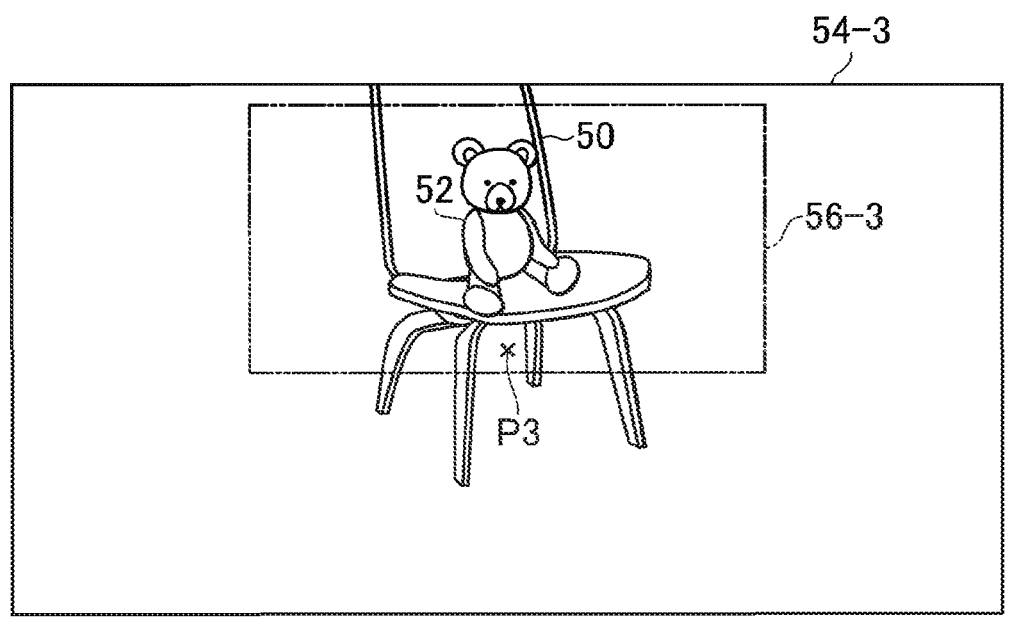
FIG. 8 is a schematic view depicting another typical captured image.

Suppose now that the visual line sensor 40a detects the visual line of the user's left eye being shifted downward from the straight-ahead direction. In this case, the left-eye camera 42a has its optical axis controlled to be shifted downward in accordance with the changed visual line direction. FIG. 8 depicts a typical image 54-3 captured by the left-eye camera 42a with its optical axis shifted downward as described above. With the optical axis of the left-eye camera 42a shifted downward, the image of the chair 50 and that of the stuffed toy 52 in the captured image 54-3 in FIG. 8 are positioned relatively higher than the corresponding image of the chair 50 and that of the stuffed toy 52 in the captured image 54-1 in FIG. 4.

As described above, when the optical axis of the left-eye camera 42a is shifted downward in accordance with the user's visual line direction being lowered, an area located higher than the center of the captured image 54-3 in FIG. 8 is identified as a cutout area 56-3.

Figure 9:
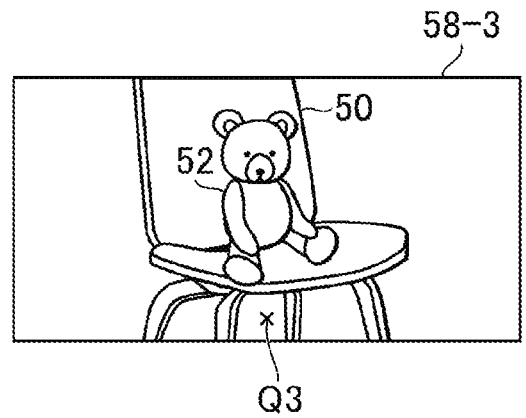
FIG. 9 is a schematic view depicting another typical partial image.

As discussed above, the display section 36 then displays a partial image 58-3 which appears in FIG. 9 and which is cut out from the captured image 54-3 in FIG. 8 as the image occupying the cutout area 56-3.

In the present embodiment, the visual field range in the real space displayed on the display section 36 when the image 54-2 or 54-3 is captured is the same as the visual field range in the real space displayed on the display section 36 when the image 54-1 is captured. That means the partial image 58-1 depicted in FIG. 5, the partial image 58-2 in FIG. 7, and the partial image 58-3 in FIG. 9 are substantially the same.

In the present embodiment, a change in the visual line direction of the left eye leads to a corresponding change in the optical axis direction of the left-eye camera 42a. The changed visual line direction of the left eye further leads to a change in how the cutout area 56 is positioned in the captured image 54. Thus even when the visual line direction of the left eye is changed, the visual field range in the real space displayed on the display section 36 remains unchanged in the present embodiment.

Generally, the characteristics of optical systems such as lenses dictate that the closer an object with its image captured by the camera section 42 is to the optical axis of the camera, the clearer the captured image of the object. For example, the image of an object is of higher resolution the closer the object is to the optical axis of the lenses in the camera. The closer an object is to the optical axis of the left-eye camera 42a, the closer the image of that object is to the center of the captured image 54. Thus in the captured image 54-1 in FIG. 4, in the captured image 54-2 in FIG. 6, or in the captured image 54-3 in FIG. 8, the image of the object near the center of the captured image 54 appears clearly.

FIG. 4 depicts a center position P1 of the captured image 54-1. In the captured image 54-1 in FIG. 4, an image of an object located near the position P1 appears clearly. FIG. 6 depicts a center position P2 of the captured image 54-2. The position P2 is located higher than the center of the cutout area 56-2 in the captured image 54-2. In the captured image 54-2 in FIG. 6, an image of an object located near the position P2 appears clearly. FIG. 8 depicts a center position P3 of the captured image 54-3. The position P3 is located lower than the center of the cutout area 56-3 in the captured image 54-3. In the captured image 54-3 in FIG. 8, an image of an object located near the position P3 appears clearly.

In the present embodiment, the image of the object located near the center of the captured image 54 is positioned in the user's visual line direction in the partial image 58.

For example, the partial image 58-1 depicted in FIG. 5 indicates a position Q1 corresponding to the position P1 in the captured image 54-1 in FIG. 4. The position Q1 is at the center of the partial image 58-1. In the present embodiment, the partial image 58-1 in FIG. 5 is displayed when the visual line of the user's left eye is in the straight-ahead direction. It follows that a clear image of the object near the position Q1 at the center of the partial image 58-1 is located in the visual line direction of the user's left eye.

For example, the partial image 58-2 in FIG. 7 indicates a position Q2 corresponding to the position P2 in the captured image 54-2 in FIG. 6. Because the position P2 is located higher than the center of the cutout area 56-2 inside the captured image 54-2 in FIG. 6 as described above, the position Q2 is located higher than the center of the partial image 58-2. In the present embodiment, the partial image 58-2 depicted in FIG. 7 is displayed when the visual line of the user's left eye is shifted upward from the straight-ahead direction. Thus a clear image of the object near the position Q2 above the center of the partial image 58-2 is located in the visual line direction of the user's left eye.

For example, the partial image 58-3 in FIG. 9 indicates a position Q3 corresponding to the position P3 in the captured image 54-3 in FIG. 8. Because the position P3 is located lower than the center of the cutout area 56-3 inside the captured image 54-3 in FIG. 8 as described above, the position Q3 is located lower than the center of the partial image 58-3. In the present embodiment, the partial image 58-3 in FIG. 9 is displayed when the visual line of the user's left eye is shifted downward from the straight-ahead direction. Thus a clear image of the object near the position Q3 below the center of the partial image 58-3 is located in the visual line direction of the user's left eye.

In the present embodiment, as discussed above, that position in the captured image 54 from which the partial image 58 is cut out is changed in accordance with the optical axis direction of the left-eye camera 42a. In this manner, the present embodiment permits changing of the position in which is displayed an image of the object near the optical axis of the left-eye camera 42a inside the image displayed on the display section 36.

Also in the present embodiment, the optical axis direction of the camera in the camera section 42 is changed in accordance with the visual line direction of the user. This makes it possible to place a clear image of the object in a position reflecting the user's visual line direction. When the partial image 58 is displayed on the HMD 12 of the present embodiment, a clear image of the object is positioned in the visual line direction of the user. This allows the user to view the clear image.

Whereas the above examples dealt with the cases where the visual line direction of the user is shifted upward or downward, the same holds for cases where the user's visual line direction is shifted left, right, or in some other way.

It was explained above that the optical axis direction of the left-eye camera 42a is controlled and the position of the cutout area 56 from which the partial image 58 is cut out as the left-eye-use image is identified in accordance with the changing visual line direction of the left eye. In like manner, the optical axis direction of the right-eye camera 42b may be controlled and the position of the cutout area 56 from which the partial image 58 is cut out as the right-eye-use image may be identified in accordance with the changing visual line direction of the right eye.

The present invention may also be applied to cases in which the camera section 42 has only one camera so that the display section 36 can display only two-dimensional images.

For example, the optical axis direction of such a camera may be controlled and the cutout area 56 may be identified in accordance with the changing visual line direction of both eyes or of either eye detected by the visual line sensor 40a. The ratio of the size of the cutout area 56 to that of the captured image 54 is not limited to what is indicated in FIG. 4, 6, or 8.

Described below are some functions of the HMD 12 embodying the present invention and the processing performed thereby.

Figure 10:
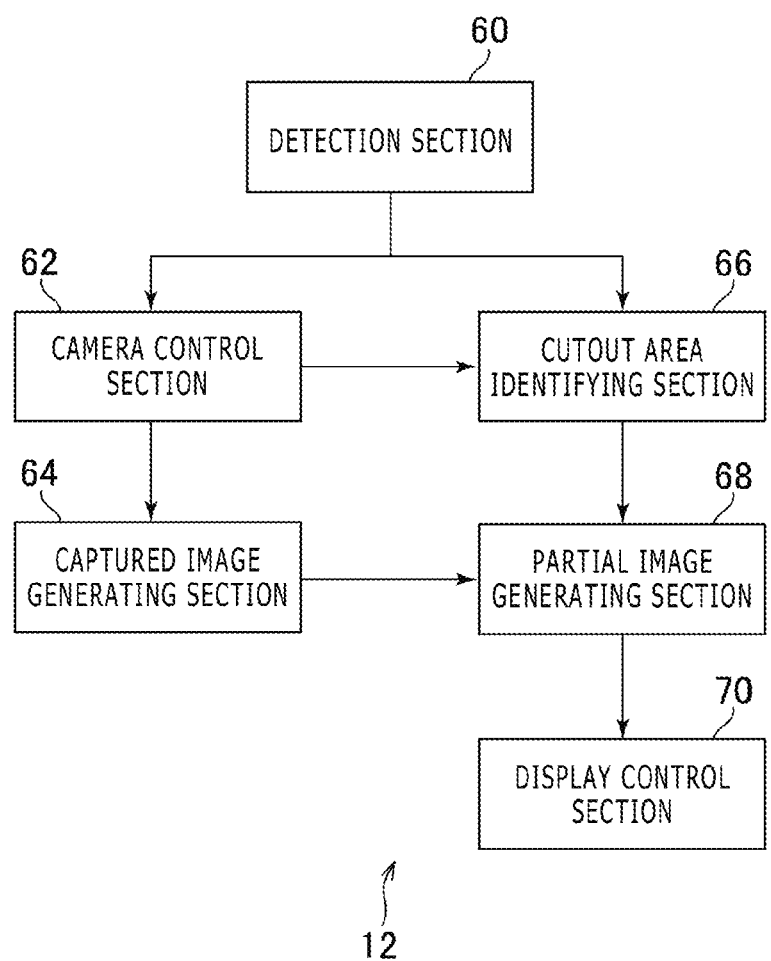
FIG. 10 is a functional block diagram depicting typical functions implemented by the head-mounted display embodying the present invention.

FIG. 10 is a functional block diagram depicting typical functions implemented by the HMD 12 embodying the present invention. The HMD 12 of the present embodiment need not implement all functions depicted in FIG. 10. The HMD 12 may also implement functions other than those indicated in FIG. 10.

As depicted in FIG. 10, the HMD 12 of the present embodiment functionally includes a detection section 60, a camera control section 62, a captured image generating section 64, a cutout area identifying section 66, a partial image generating section 68, and a display control section 70, for example. The detection section 60 is implemented using mainly the visual line sensor 40a. The camera control section 62 is implemented using mainly the control section 30 and drive section 44. The captured image generating section 64 is implemented using mainly the camera section 42. The cutout area identifying section 66 and the partial image generating section 68 are implemented using mainly the control section 30. The display control section 70 is implemented using mainly the control section 30 and display section 36.

The above-mentioned functions are practiced by the control section 30 executing a program which is installed in the HMD 12 acting as a computer and which includes commands corresponding to these functions. The program, when supplied to the HMD 12, is stored on computer-readable information storage media such as optical disks, magnetic disks, magnetic tapes, magneto-optical disks, or flash memories; or transmitted typically over the Internet.

The detection section 60 in the present embodiment detects the visual line direction of the user at a predetermined frame rate, for example.

The camera control section 62 in the present embodiment controls at a predetermined frame rate the optical axis direction of the camera in the camera section 42. The camera control section 62 in the present embodiment controls the optical axis direction of the camera in accordance with the user's visual line direction detected by the detection section 60. In the present embodiment, the camera control section 62 controls the optical axis direction of the left-eye camera 42a in accordance with the visual line direction of the user's left eye detected by the detection section 60. The camera control section 62 further controls the optical axis direction of the right-eye camera 42b in accordance with the visual line direction of the user's right eye detected by the detection section 60. As discussed above, the camera control section 62 may change the optical axis direction of the camera in a direction in which the user's visual line detected by the detection section 60 is turned. At this point, the direction and angle in which the optical axis of the camera is changed may be arranged to coincide with the direction and angle in which the user's visual line is changed. Alternatively, the direction and angle in which the user's visual line is changed need not coincide with the direction and angle in which the optical axis of the camera is changed.

The captured image generating section 64 in the present embodiment generates the captured image 54, for example.

The present embodiment allows the left-eye-use captured image 54 and the right-eye-use captured image 54 to be generated at a predetermined frame rate in the manner discussed above.

The cutout area identifying section 66 in the present embodiment identifies the position of the cutout area 56 in the captured image 54, for example. The cutout area identifying section 66 may identify, at a predetermined frame rate, the position of the cutout area 56 inside the captured image 54 on the basis of the optical axis direction of the camera in the camera section 42. Alternatively, the cutout area identifying section 66 may identify, at a predetermined frame rate, the position of the cutout area 56 in accordance with the visual line direction detected by the detection section 60.

In the present embodiment, as discussed above, when the optical axis of the camera in the camera section 42 is changed, the position of the cutout area 56 in the captured image 54 is changed in a direction opposite the changed optical axis direction of the camera in the camera section 42.

The cutout area identifying section 66 may identify a cutout area 56 whose visual field range is the same as that of the image occupied by the cutout area 56 inside the captured image 54 generated in the preceding frame.

The cutout area identifying section 66 may hold data indicative of the corresponding relation between the position of the cutout area 56 and the optical axis direction of the camera or the corresponding relation between the position of the cutout area 56 and the visual line direction of the user. The cutout area identifying section 66 may then identify the position of the cutout area 56 in the captured image 54 in accordance with the visual line direction or the optical axis direction of the camera in the camera section 42 and on the basis of the data held inside.

The partial image generating section 68 in the present embodiment generates the partial image 58, for example. The partial image generating section 68 may generate the partial image 58 by cutting out an image occupying the cutout area 56 from the captured image 54 as the partial image 58.

The display control section 70 in the present embodiment causes the display section 36 to display the partial image 58 which is cut out from the image 54 captured by the camera in the camera section 42 and which is a portion corresponding to the optical axis direction of the camera in the camera section 42, for example. In the present embodiment, the display control section 70 causes the display section 36 to display the partial image 58 generated by the partial image generating section 68. As described above, when the optical axis direction of the camera is changed, the position of the cutout area 56 in the captured image 54 from which the partial image 58 is cut out may be changed in a direction opposite the changed optical axis direction of the camera. The display control section 70 may perform control such as to display the image of the object on the optical axis of the camera in a position in the visual line direction of the user, as discussed above.

Figure 11:
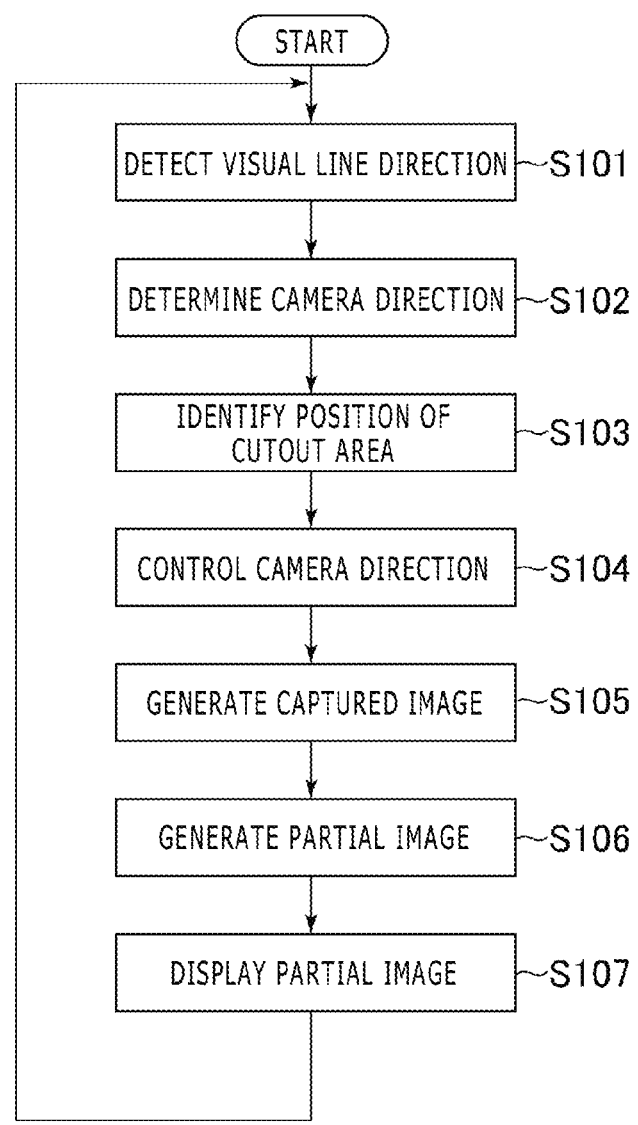
FIG. 11 is a flowchart depicting a typical flow of processing performed by the head-mounted display embodying the present invention.

Described below with reference to the flowchart in FIG. 11 is a typical flow of display control processing performed at a predetermined frame rate by the HMD 12 embodying the present invention. The ensuing paragraphs will explain an example of the processing for causing the display section 36 to display the partial image 58 as the left-eye-use image at a predetermined frame rate.

First of all, the detection section 60 detects the visual line direction of the user's left eye (S101)

Based on the visual line direction detected in the process in S101, the camera control section 62 determines the direction of the left-eye camera 42a (S102).

In accordance with the direction of the left-eye camera 42a determined in the process in S102, the cutout area identifying section 66 identifies the position of the cutout area 56 in the captured image 54 (S103).

The camera control section 62 then controls the direction of the left-eye camera 42a in such a manner that the left-eye camera 42a is turned in the direction determined in the process in S102 (S104).

The captured image generating section 64 generates the image 54 captured by the left-eye camera 42a whose direction is controlled in the process in S103 (S105).

The partial image generating section 68 generates the partial image 58 by cutting out as the partial image 58 an image occupying the cutout area 56 whose position was determined in the process in S103 from the image 54 captured in the process in S105 (S106).

The display control section 70 then causes the display section 36 to display the partial image 58 generated in the process in S106 (S107).

In the present processing example, the processes in S101 to S107 are repeated at a predetermined frame rate as described above.

In the same manner as in the present processing example, the partial image 58 as the right-eye-use image is displayed on the display section 36 at a predetermined frame rate.

Whereas it was explained above that the direction of the left-eye camera 42a and that of the right-eye camera 42b are independently controlled, the directions of the two cameras may alternatively be controlled in a linked manner.

The flow of the display control processing performed at a predetermined frame rate is not limited to what is depicted in FIG. 11. Alternatively, the process in S103 may be interposed between the process in S104 and that in S105, or between the process in S105 and that in S106.

The present invention is not limited to the embodiments described above.

For example, if it is determined that a certain image is included in the image 54 captured by the camera in the camera section 42, the camera control section 62 may start controlling the optical axis direction of the camera. In this case, with control of the optical axis direction of the camera started, the changing of the position of the cutout area 56 is also started. This makes it possible to control, depending on the captured image, whether or not to present the user with an image whose clear spot is changed in keeping with the changing visual line direction.

Specifically, if it is determined, based on known shape recognition technique, that the captured image 54 includes an image of a predetermined object such as a book, for example, the camera control section 62 may start controlling the optical axis direction of the camera. As another example, if it is determined, based on known character recognition technique, that the captured image 54 includes an image of at least a predetermined number of characters, the camera control section 62 may start controlling the optical axis direction of the camera. As a further example, if it is determined that the captured image 54 includes an image of a smartphone, the camera control section 62 may start controlling the optical axis direction of the camera. Generally, when people follow characters visually on the smartphone or in the book, they tend to move their visual line direction vigorously without moving the head. Thus if the visual line direction of the user is highly likely to move quickly, the above variations of the present invention may present the user with the image whose clear spot is changed in keeping with the changing visual line direction.

As another example, if it is determined that the user wearing the HMD 12 is looking down, control of the optical axis direction of the camera may be started as described above. Thus when the user is reading a book, looking at a smartphone, or looking down otherwise, the user may be presented with the image whose clear spot is changed in keeping with the changing visual line direction of the user.

Whether or not the user wearing the HMD 12 is looking down may be determined in accordance with the image 54 captured by the camera section 42 or the captured image 54 in combination with the result of detection by the sensor section 40. For example, known image analysis technique may be used to identify that area in the captured image 54 in which an image of the floor is located. If the ratio of the size of the identified area to the whole size of the captured image 54 is larger than a predetermined ratio, then it may be determined that the user wearing the HMD 12 is looking down. As another example, whether the user wearing the HMD 12 is looking down may be determined on the basis of the measurements acquired by the motion/rotation sensor 40*b*.

As a further example, whether the user wearing the HMD 12 is looking down may be determined on the basis of images captured by the cameras 20*a*.

As another example, when the visual line sensor 40*a* detects that the user's visual line is shifted downward from the straight-ahead direction and that the visual line direction is at least at 45 degrees relative to the horizontal direction, control of the optical axis direction of the camera may be started. In this manner, whenever the user's visual line is shifted downward, the user may be presented with the image whose clear spot is changed in keeping with the changing visual line direction.

As a further example, on the basis of the iris recognized by the visual line sensor 40*a*, the user wearing the HMD 12 may be identified, and whether or not the user has ever worn the HMD 12 may be determined. If it is determined that the identified user has never worn the HMD 12 before, the HMD 12 may be calibrated with regard to that user and the results of the calibration may be stored into the storage section 32. On the other hand, if the identified user is determined to have worn the HMD 12 in the past, calibrations need not be carried out anew, and the results of the calibration stored in the storage section 32 may be utilized.

As another example, the HMD 12 may cause the display section 36 to display an image processed in such a manner that its resolution in the visual line direction detected by the visual line sensor 40*a* will be increased.

It is to be noted that the division of roles between the HMD 12 and the entertainment device 14 is not limited to what was discussed above. For example, the entertainment device 14 may generate the partial image 58 based on the captured image 54.

The specific character strings and values given in the foregoing description as well as in the accompanying drawings are only examples and are not limitative of the present invention.

The invention claimed is:

1. A head-mounted display worn by a user, comprising:
   a display section configured to be disposed in front of eyes of the user;
   a camera attached to the head-mounted display worn by the user configured to capture images of what is ahead of the display section;
   a detection section configured to detect varying directions of a visual line of the user's eyes;
   a camera control section configured to change directions of an optical axis of the camera in accordance with the varying directions of the visual line of the user's eyes, such that the capture images change in accordance with the varying directions of the visual line of the user's eyes; and
   a display control section configured to cause the display section to display partial images cut out from the capture images captured by the camera, wherein:
   the partial images are cut out from different positions within the capture images in response to: (i) the varying directions of the visual line of the user's eyes, and (ii) changing directions of the optical axis of the camera, such that when the direction of the optical axis of the camera is changed, the different position in the capture image from which the partial image is cut out is changed opposite to the changed direction of the optical axis of the camera.

2. The head-mounted display according to claim 1, wherein the display control section performs control in a manner causing an image of an object on the optical axis of the camera to be displayed in a position in the visual line direction of the user.

3. The head-mounted display according to claim 1, wherein, if the image captured by the camera includes a predetermined image, the camera control section starts controlling the optical axis direction of the camera.

4. A display control method comprising:
   disposing a display section in front of eyes of a user;
   providing a camera attached to a head-mounted display worn by the user and configured to capture images of what is ahead of the display section;
   detecting varying directions of a visual line of the user's eyes;
   changing directions of an optical axis of the camera in accordance with the varying directions of the visual line of the user's eyes, such that the capture images change in accordance with the varying directions of the visual line of the user's eyes; and
   causing a display section to display partial images cut out from the capture images captured by the camera, wherein:
   the partial images are cut out from different positions within the capture images in response to: (i) the varying directions of the visual line of the user's eyes, and (ii) changing directions of the optical axis of the camera, such that when the direction of the optical axis of the camera is changed, the different position in the capture image from which the partial image is cut out is changed opposite to the changed direction of the optical axis of the camera.

5. A non-transitory, computer readable storage medium containing a computer program, which when executed by a computer, causes the computer to carry out actions in connection with a display section disposed in front of eyes of a user and a camera attached to a head-mounted display worn by the user and configured to capture images of what is ahead of the display section, the actions comprising:
   detecting varying directions of a visual line of the user's eyes;
   changing directions of an optical axis of the camera in accordance with the varying directions of the visual line of the user's eyes, such that the capture images change in accordance with the varying directions of the visual line of the user's eyes; and causing a display section to display partial images cut out
from the capture images captured by the camera,
wherein:

the partial images are cut out from different positions
within the capture images in response to: (i) the varying
directions of the visual line of the user's eyes, and (ii)
changing directions of the optical axis of the camera,
such that when the direction of the optical axis of the
camera is changed, the different position in the capture
image from which the partial image is cut out is
changed opposite to the changed direction of the optical
axis of the camera.

* * * * *